(12) United States Patent
Nakaki et al.

(10) Patent No.: US 7,145,144 B2
(45) Date of Patent: Dec. 5, 2006

(54) THERMAL INFRARED SENSOR DEVICE AND THERMAL INFRARED SENSOR ARRAY

(75) Inventors: Yoshiyuki Nakaki, Hyogo (JP); Yoshio Fujii, Hyogo (JP); Hisatoshi Hata, Hyogo (JP); Hiromoto Inoue, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 196 days.

(21) Appl. No.: 10/855,507

(22) Filed: May 28, 2004

(65) Prior Publication Data
US 2005/0178967 A1 Aug. 18, 2005

(30) Foreign Application Priority Data
Feb. 17, 2004 (JP) ............................. 2004-040092

(51) Int. Cl.
*G01J 5/20* (2006.01)
(52) U.S. Cl. .................................. 250/339.04
(58) Field of Classification Search ........... 250/339.04, 250/338.1, 338.4
See application file for complete search history.

(56) References Cited
U.S. PATENT DOCUMENTS

| | | | |
|---|---|---|---|
| 6,031,231 A | 2/2000 | Kimata et al. | |
| 6,552,344 B1 | 4/2003 | Sone et al. | |
| 6,576,556 B1 | 6/2003 | Kimata et al. | |
| 6,667,479 B1 | 12/2003 | Ray | |
| 7,005,644 B1 * | 2/2006 | Ishikawa et al. | 250/339.04 |
| 2002/0139784 A1 * | 10/2002 | Tsuchiya et al. | 219/121.69 |
| 2003/0133489 A1 | 7/2003 | Hirota et al. | |

FOREIGN PATENT DOCUMENTS

| | | | |
|---|---|---|---|
| JP | 07-190854 | | 7/1995 |
| JP | 2000-321125 | | 11/2000 |
| JP | 2001-215151 A | * | 8/2001 |
| WO | WO 94/01743 | | 1/1994 |

* cited by examiner

Primary Examiner—Otilia Gabor
(74) Attorney, Agent, or Firm—Leydig, Voit & Mayer, Ltd.

(57) ABSTRACT

A thermal infrared sensor device includes a substrate having a concave portion, a temperature detecting portion connected to the substrate via a supporting leg held at an upper portion of a space within the concave portion, an infrared reflecting film covering at least a portion of the supporting leg without being thermally connected to the temperature detecting portion, and an absorbing hood portion held opposite the infrared reflecting film and thermally connected to the temperature detecting portion, without being thermally connected to the infrared reflecting film, and extending laterally, in a plate shape, covering at least a portion of the infrared reflecting film.

10 Claims, 8 Drawing Sheets

THERMAL INFRARED SENSOR DEVICE AND THERMAL INFRARED SENSOR ARRAY

BACKGROUND OF THE INVENTION

1. Field of the Invention

The present invention relates to a thermal infrared sensor device and a thermal infrared sensor array.

2. Description of the Background Art

As an example of a conventional thermal infrared sensor device, Japanese Patent Laying-Open No. 2003-207391 proposes a technique to reduce effective reflectivity and improve infrared absorption efficiency by forming a three-dimensional structure having dimensions in micrometers, as described in paragraphs [0011]–[0012] and shown in FIG. 1(a) and (b). As another example, Japanese Patent Laying-Open No. 7-190854 proposes, in paragraph [0007], a thermal infrared sensor device allowing incident infrared light to be reflected multiple times within a concave portion serving as a detecting portion to improve infrared absorption efficiency substantially. These thermal infrared sensor devices are fabricated by bulk micromachining, a process for forming a concave portion in a surface of a silicon substrate.

Further, for example, Japanese Patent No. 3062627 proposes a technique in which a reflecting layer 18 is formed on an upper surface of a substrate and an absorber coating layer 23 is formed thereon, as described on page 2, right column, line 44 to page 3, left column, line 27 and shown in FIG. 1, to thereby enhance infrared absorption efficiency, as described on page 4, left column, lines 11–15 and shown in FIG. 3. High infrared absorption efficiency is also achieved by a technique proposed for example in U.S. Pat. No. 6,667,479 to provide a reflector layer 34A below a detection structure 24 having a detection layer 28 therein, as described in column 2, lines 14 through 23 and shown in FIG. 1. In these techniques, a thermal infrared sensor device is fabricated by surface micromachining, a process for providing a structure on an upper surface of a substrate by processing a sacrificial layer formed on the substrate.

Such a conventional thermal infrared sensor device as described above requires a complex structure to obtain high absorption efficiency. Since the thermal infrared sensor device has a complicated structure and a large film thickness of the order of micrometers, heat capacity of the entire thermal infrared sensor device has become increased. To achieve a thermal infrared sensor device with higher performance, however, it is necessary to improve heat insulation properties and to convert received infrared radiation (heat rays) to a greater change in temperature. To maintain good responsiveness while improving heat insulation properties, the thermal infrared sensor device should have smaller heat capacity as a whole.

The conventional thermal infrared sensor device formed by surface micromachining can achieve high infrared absorption efficiency without requiring a complex structure. The device, however, requires a special material for its fabrication, and thus it has a problem with productivity.

On the other hand, U.S. Pat. No. 6,576,556 proposes, in FIGS. 1–7, a diode infrared sensor device which can be fabricated by bulk-surface composite micromachining, a combination of bulk micromachining and surface micromachining. The publication's FIGS. 1–7 show a manufacturing process, of which FIG. 7 shows a completed device. This infrared sensor device achieves high infrared absorption efficiency. Furthermore, Japanese Patent Laying-Open No. 2000-321125 shows in FIG. 1 a structure in which a detecting portion is provided with a reflecting layer 10 for improved properties. However, the structure in Japanese Patent Laying-Open No. 2000-321125 has greater heat capacity than that of the structure provided by U.S. Pat. No. 6,576,556, and thus it has a problem with deterioration in responsiveness.

SUMMARY OF THE INVENTION

An object of the invention is to provide a thermal infrared sensor device and a thermal infrared sensor array having improved infrared absorption efficiency without causing an increase in heat capacity.

To achieve the foregoing object, a thermal infrared sensor device in accordance with the present invention includes a substrate having a concave portion, a temperature detecting portion connected to the substrate via a supporting leg to be held at an upper portion of a space within the concave portion, an infrared reflecting film disposed to cover at least a portion of the supporting leg without being thermally connected to the temperature detecting portion, and an absorbing hood portion held above the infrared reflecting film with being thermally connected to the temperature detecting portion and without being thermally connected to the infrared reflecting film, and extending laterally in a plate shape to cover at least a portion of the infrared reflecting film.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
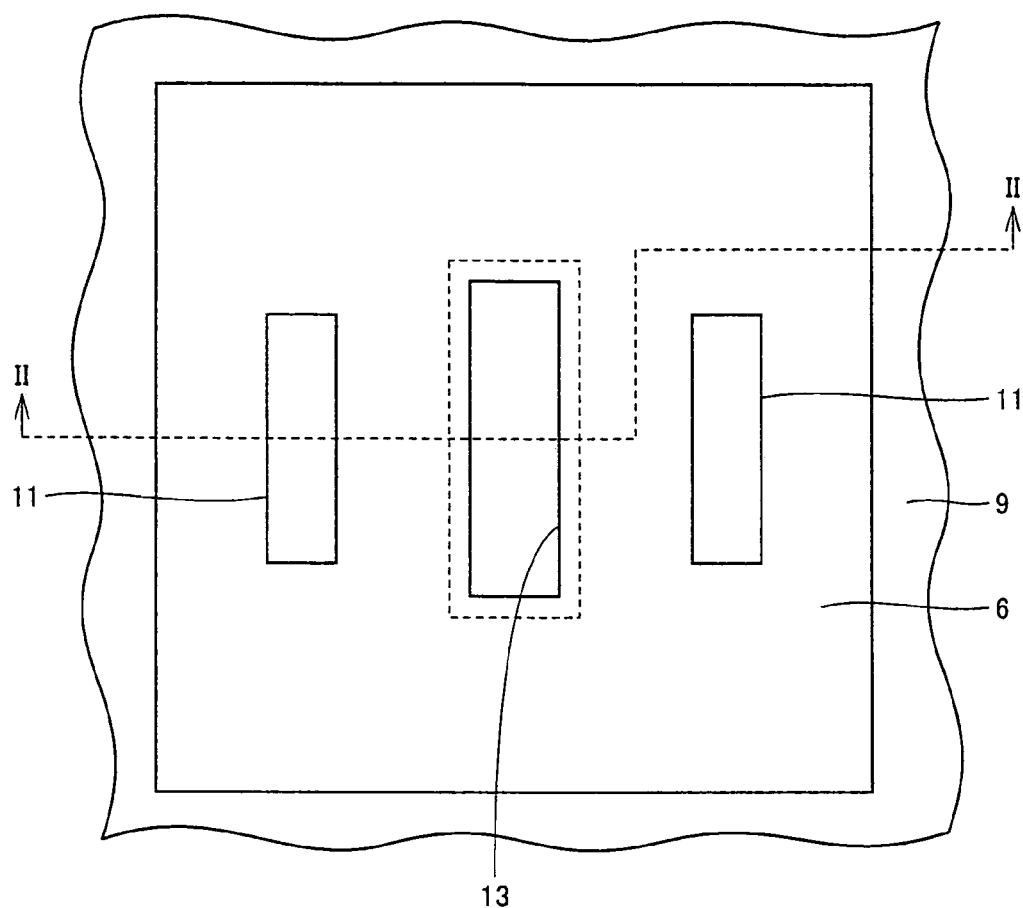
FIG. 1 is a plan view of a thermal infrared sensor device in a first embodiment in accordance with the present invention.
Figure 2:
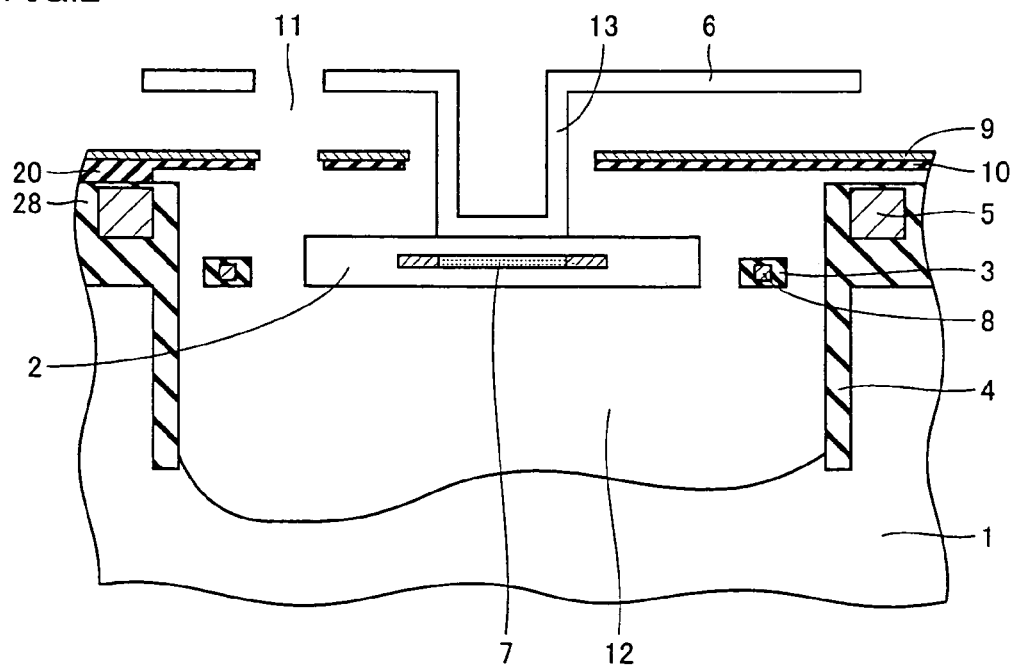
FIG. 2 is a cross-sectional view taken along line II—II in FIG. 1.

Referring to FIGS. 1 and 2, a thermal infrared sensor device in a first embodiment in accordance with the present invention will be described. When the thermal infrared sensor device is-seen from above, an absorbing hood portion 6 is provided to cover an infrared reflecting film 9, as shown in FIG. 1. Absorbing hood portion 6 has substantially at its center a depression with a pillar portion 13, and also has two etching holes 11 disposed at positions slightly apart from the depression so as to sandwich the depression. FIG. 2 shows a cross-sectional view taken along line II—II in FIG. 1. Below absorbing hood portion 6, a concave portion 12 is formed in a substrate 1. Substrate 1 is for example a silicon substrate.

Figure 3:
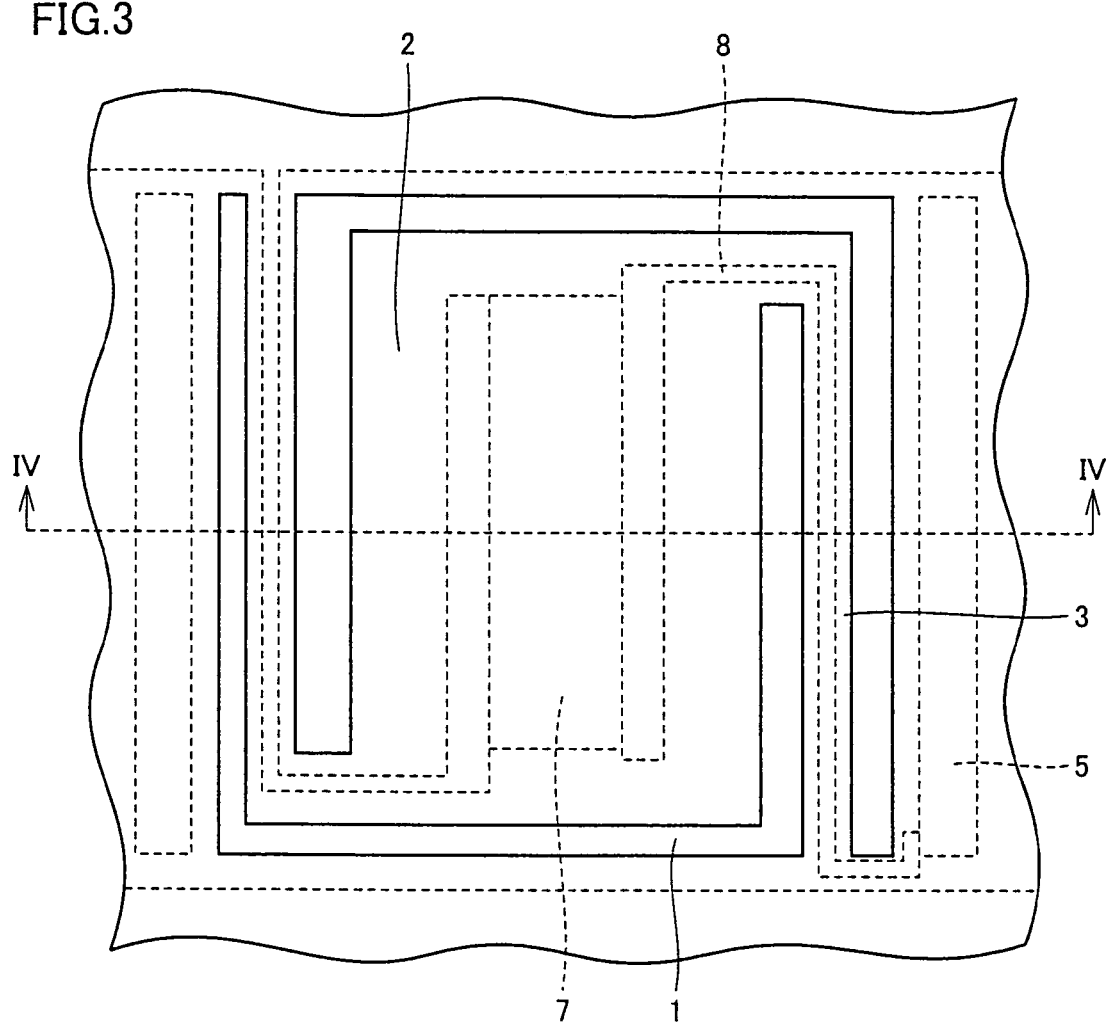
FIG. 3 is a plan view showing a first step in a process of manufacturing the thermal infrared sensor device in the first embodiment in accordance with the present invention.

The thermal infrared sensor device includes a temperature detecting portion 2 for converting a change in temperature into an electrical signal. Temperature detecting portion 2 is connected to substrate 1 via a supporting leg 3 to be held at an upper portion of a space within concave portion 12. In this example, there are two supporting legs 3, each of which is shaped like a bridge bent in the form of the letter L, as shown in FIG. 3. Supporting leg 3 includes a thin film metal interconnection 8 and a dielectric film supporting the same.

Temperature detecting portion 2 includes a detection film 7. Detection film 7 is a diode using crystalline silicon, for example. Thin film metal interconnection 8 electrically connects detection film 7 with an aluminum interconnection 5. Thin film metal interconnection 8 is formed of a film of a titanium alloy having a thickness of 100 nm, for example. An electrical signal output from detection film 7 is transmitted to aluminum interconnection 5 via thin film metal interconnection 8 included in supporting leg 3, and then taken out by a detector circuit (not shown). Electrical connections between thin film metal interconnection 8 and detection film 7, and between thin film metal interconnection 8 and aluminum interconnection 5 are provided as appropriate through vertically extending conductive members (not shown).

Infrared reflecting film 9 is formed on an upper surface of a support 10, and supported by support 10 to cover almost all over concave portion 12. Infrared reflecting film 9 and support 10 are disposed to cover at least a portion of supporting leg 3, without being thermally connected to temperature detecting portion 2. Support 10 is secured via an anchor portion 20 to an interconnection protecting insulating film 28 including aluminum interconnection 5 therein. Therefore, infrared reflecting film 9 is connected to interconnection protecting insulating film 28 thermally and mechanically.

Absorbing hood portion 6 includes a metal thin film which becomes an absorbing film, and a dielectric film supporting the same. Although the absorbing film and the dielectric film are not distinguishably shown in detail in the drawings, they are for example formed as a two-layered structure. The absorbing film is for example a 5 nm-thick film made of chrome, and the dielectric film is for example a 200 nm-thick film made of silicon oxide. As shown in FIG. 2, absorbing hood portion 6 is mounted on an upper side of temperature detecting portion 2 via pillar portion 13, which means that absorbing hood portion 6 is thermally connected to temperature detecting portion 2. Absorbing hood portion 6 is held above infrared reflecting film 9 without being thermally connected to infrared reflecting film 9 and support 10, and extends laterally in a plate shape to cover at least a portion of infrared reflecting film 9.

As for etching hole 11, a through hole is provided not only in absorbing hood portion 6 but also in infrared reflecting film 9 and support 10. As a result, communication is established between a space above absorbing hood portion 6 and the inside of concave portion 12.

A vertical distance between the absorbing film of absorbing hood portion 6 and infrared reflecting film 9 will hereinafter be referred to as an "optical cavity". The optical cavity is designed to have an optical length about a quarter a wavelength of infrared radiation to be detected. For example, in the case of a thermal infrared sensor device for far infrared radiation, the optical cavity is designed to be about 2 μm.

In the present embodiment, infrared radiation applied from above is absorbed directly into absorbing hood portion 6 from its upper side, and also reflected by infrared reflecting film 9, incident on absorbing hood portion 6 from its downside, and then absorbed into absorbing hood portion 6. Since concave portion 12 is covered with infrared reflecting film 9 almost entirely, the infrared radiation seldom enters concave portion 12 directly. Thus, the infrared radiation is efficiently absorbed into absorbing hood portion 6. As an example, a structure in the present embodiment can achieve absorption efficiency of 70% or more. Since infrared reflecting film 9, on which most of the infrared radiation coming from above is to be incident, is thermally isolated from temperature detecting portion 2, absorption efficiency can be enhanced without causing an increase in heat capacity of a sensor. Note that, since absorbing hood portion 6 and temperature detecting portion 2 are thermally connected by tubular pillar portion 13, a change in temperature caused by the absorption of the infrared radiation into absorbing hood portion 6 is quickly and accurately transferred to temperature detecting portion 2, allowing for correct detection of the temperature.

Figure 4:
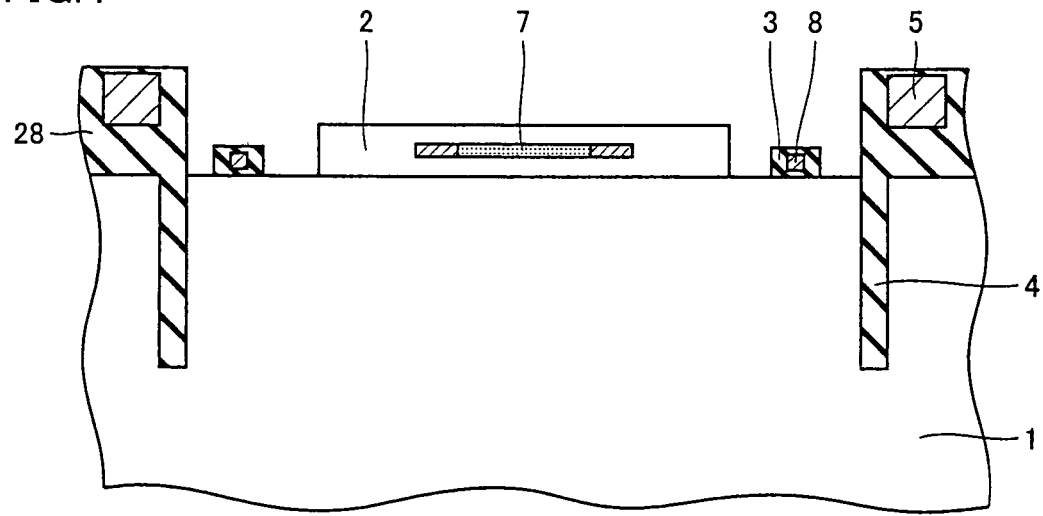
FIG. 4 is a cross-sectional view taken along line IV—IV in FIG. 3.

Referring to FIGS. 3–7, 1 and 2, a method of manufacturing the thermal infrared sensor device in the first embodiment in accordance with the present invention will be described. Firstly, a structure shown in FIGS. 3 and 4 is fabricated. FIG. 4 is a cross-sectional view taken along line IV—IV in FIG. 3. As shown in FIG. 4, a trench is formed in substrate 1, and an etching-resistant wall 4 is formed to fill in the trench. Aluminum interconnection 5 is formed in an upper portion of etching-resistant wall 4. Temperature detecting portion 2 is formed at the center of a region corresponding to a portion between etching-resistant walls 4 when seen from above, using a known technique. Temperature detecting portion 2 is formed to include detection film 7. Supporting leg 3 is formed such that temperature detecting portion 2 is connected via supporting leg 3 to interconnection protecting insulating film 28 including aluminum interconnection 5 therein. Thin film metal interconnection 8 included in supporting leg 3 is electrically connected to aluminum interconnection 5.

Figure 5:
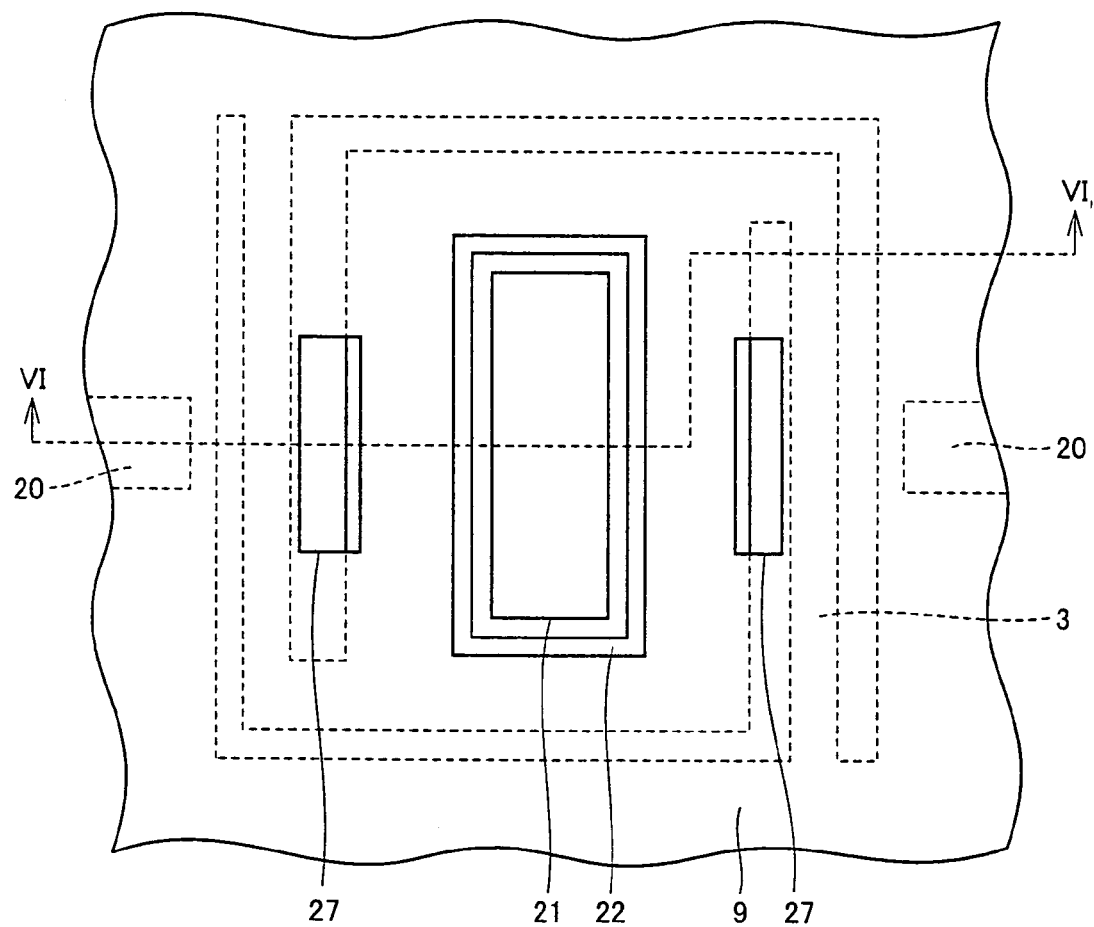
FIG. 5 is a plan view showing a second step in the process of manufacturing the thermal infrared sensor device in the first embodiment in accordance with the present invention.
Figure 6:
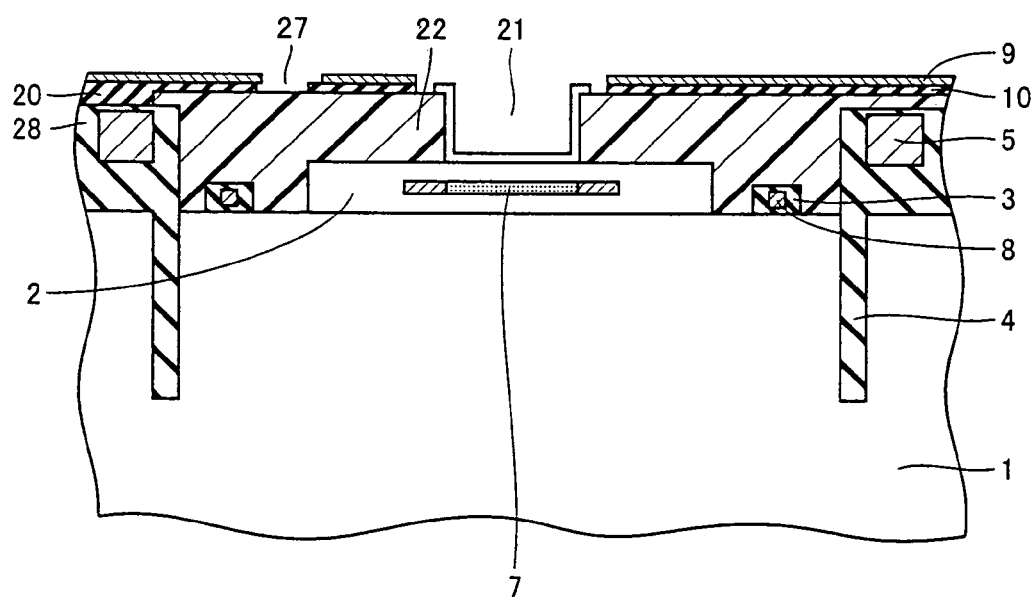
FIG. 6 is a cross-sectional view taken along line VI—VI in FIG. 5.

As shown in FIGS. 5 and 6, a sacrificial layer 22 is formed to cover substrate 1. FIG. 6 is a cross-sectional view taken along line VI—VI in FIG. 5. Sacrificial layer 22 can be formed by photolithography, using a heat-resistant organic film. In sacrificial layer 22, openings are provided in regions which will later be a concave portion 21 and anchor portion 20 (see FIG. 6).

Further, support 10 and infrared reflecting film 9 are formed to cover sacrificial layer 22. On this occasion, the opening having been provided on the upper side of interconnection protecting insulating film 28 is filled with the same material as that of support 10, and becomes anchor portion 20. As a result, support 10 is disposed on the upper side of interconnection protecting insulating film 28 via anchor portion 20. The uppermost surface of infrared reflecting film 9 can be made of a metal having high reflectivity, such as aluminum, gold, or platinum. Support 10 may be formed for example of silicon oxide. Sacrificial layer 22 is further planarized as appropriate by a known technique such as CMP (chemical mechanical polishing), or etch back by plasma dry etching.

Concave portion 21 is provided at the center so as to pass through infrared reflecting film 9, support 10 and sacrificial layer 22. An opening 27, which will later be the etching hole, is provided on either side of concave portion 21, at a position slightly apart from concave portion 21. In opening 27, support 10 and infrared reflecting film 9 are removed and sacrificial layer 22 is exposed.

Figure 7:
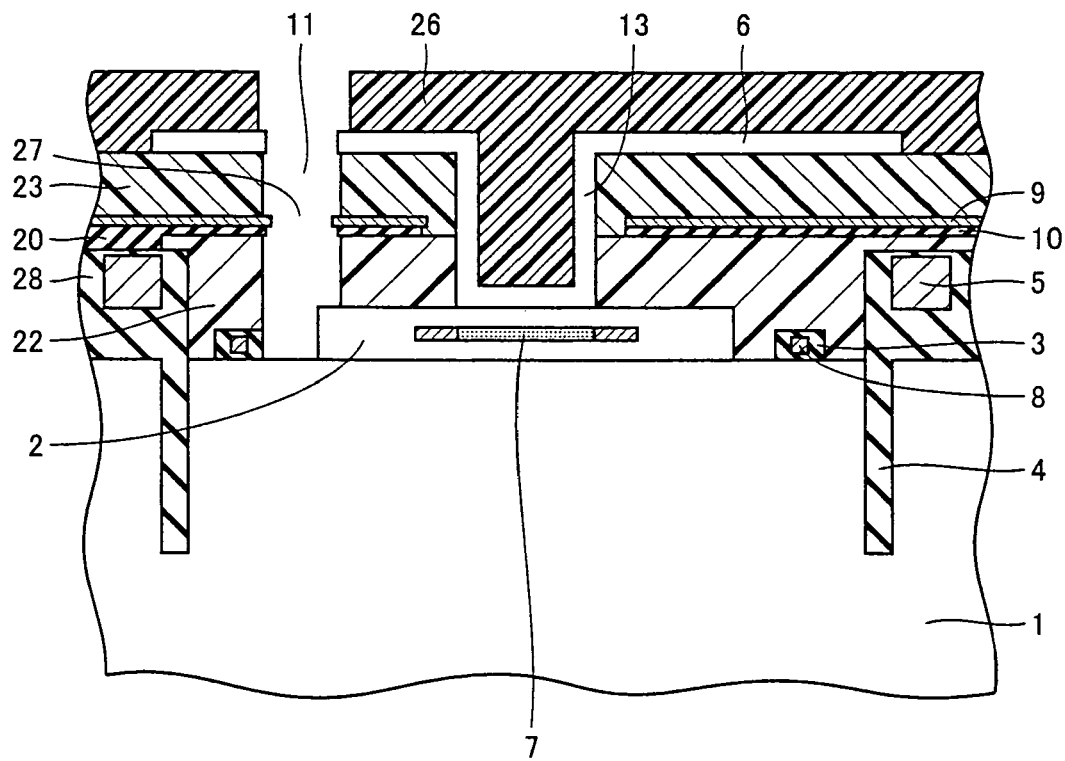
FIG. 7 is a cross-sectional view showing a third step in the process of manufacturing the thermal infrared sensor device in the first embodiment in accordance with the present invention.

As shown in FIG. 7, a sacrificial layer 23 made of an organic material is formed to cover infrared reflecting film 9. Sacrificial layer 23 is further planarized as appropriate by a known technique. Further, the concave portion is extended to pass through sacrificial layer 23, and then a film is formed to cover the inside of the concave portion as well as the upper surface of sacrificial layer 23. This film becomes pillar portion 13 and absorbing hood portion 6. Furthermore, a protective resist 26 is formed to cover absorbing hood portion 6. Protective resist 26 is then patterned and used as a mask to form etching hole 11. Etching hole 11 is formed to pass through sacrificial layer 23, opening 27, and sacrificial layer 22 in order. As a result, substrate 1 is exposed at the bottom of etching hole 11.

Using protective resist 26 as a mask, etching is performed by utilizing hydrofluoric acid or vapor phase hydrogen fluoride. For substrate 1 made of silicon, spontaneous isotropic etching utilizing for example xenon difluoride is performed through etching hole 11, to isotropically etch a portion of substrate 1 sandwiched between etching-resistant walls 4. For sacrificial layers 22 and 23, isotropic etching mainly utilizing for example oxygen gas is performed through etching hole 11, to remove sacrificial layers 22 and 23 under absorbing hood portion 6.

Thus, the thermal infrared sensor device having the structure shown in FIGS. 1 and 2 is obtained.

Note that, when sacrificial layers 22 and 23 are formed from an organic material by spin coating and patterned by photolithography, the sensor device can be fabricated easier than a conventional thermal infrared sensor device.

Although the concave portion which becomes pillar portion 13 is formed in sacrificial layers 22 and 23 respectively through separate steps in the example described above, the concave portion may be formed in a single step, after sacrificial layer 22, infrared reflecting film 9, support 10 and sacrificial layer 23 are formed so as to be stacked one after another.

Second Embodiment

Figure 8:
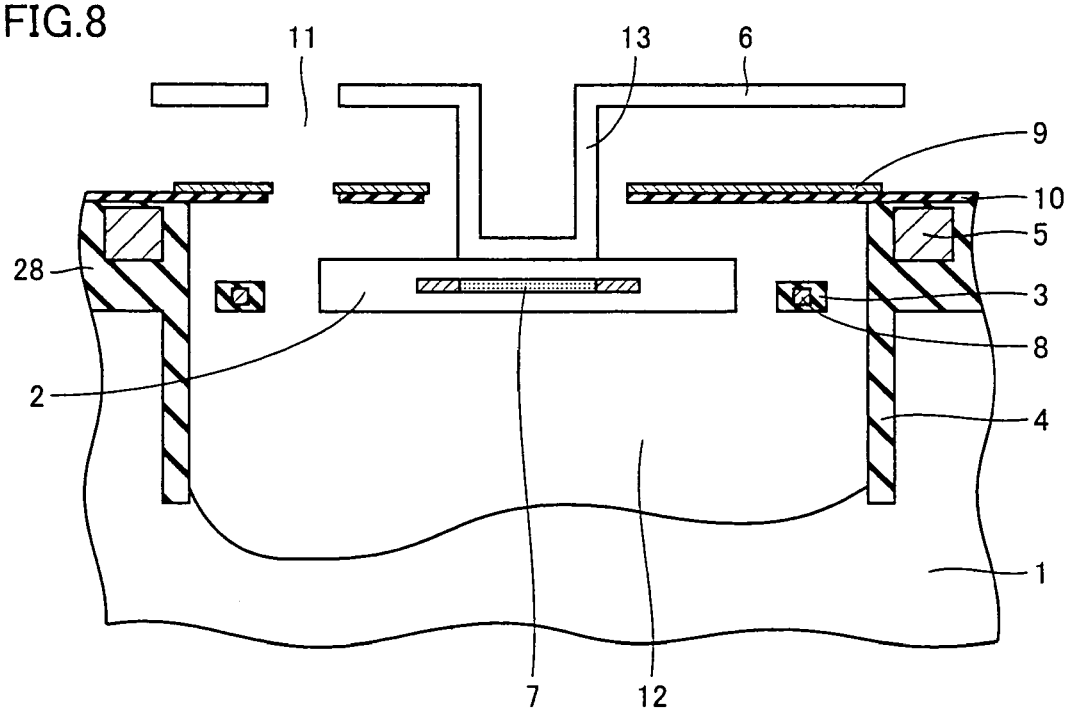
FIG. 8 is a cross-sectional view of a thermal infrared sensor device in a second embodiment in accordance with the present invention.

Referring to FIG. 8, a thermal infrared sensor device in a second embodiment in accordance with the present invention will be described. The thermal infrared sensor device has basically the same structure as that in the first embodiment, except that the thermal infrared sensor device in the present embodiment does not have a portion corresponding to anchor portion 20 in the first embodiment (see FIG. 2), and support 10 is directly provided on the upper side of interconnection protecting insulating film 28, as shown in FIG. 8.

This thermal infrared sensor device can be obtained by partially modifying the method of manufacturing the thermal infrared sensor device described in the first embodiment. More specifically, when forming sacrificial layer 22, it is provided so as to have a height nearly equal to that of interconnection protecting insulating film 28. Thereafter, an opening is formed in a region of sacrificial layer 22 which will later be concave portion 21, and support 10 and infrared reflecting film 9 are formed to cover sacrificial layer 22, thus providing this thermal infrared sensor device.

Compared to the structure shown in the first embodiment, a difference in level at anchor portion 20 is eliminated in the present embodiment, reducing the height of the entire device. In addition, the photolithography process during manufacturing can be simplified.

Further, when forming infrared reflecting film 9, it is more preferable to form infrared reflecting film 9 so as to avoid a region of support 10 corresponding to a portion above aluminum interconnection 5, as shown in FIG. 8. This structure can reduce electrical stray capacitance generated between infrared reflecting film 9 and aluminum interconnection 5. Furthermore, although infrared reflecting film 9 has a smaller area in this structure, aluminum interconnection 5 serves as a substitute for infrared reflecting film 9 and reflects infrared radiation coming from above toward absorbing hood portion 6. Therefore, deterioration of infrared absorption properties can be avoided.

Third Embodiment

Figure 9:
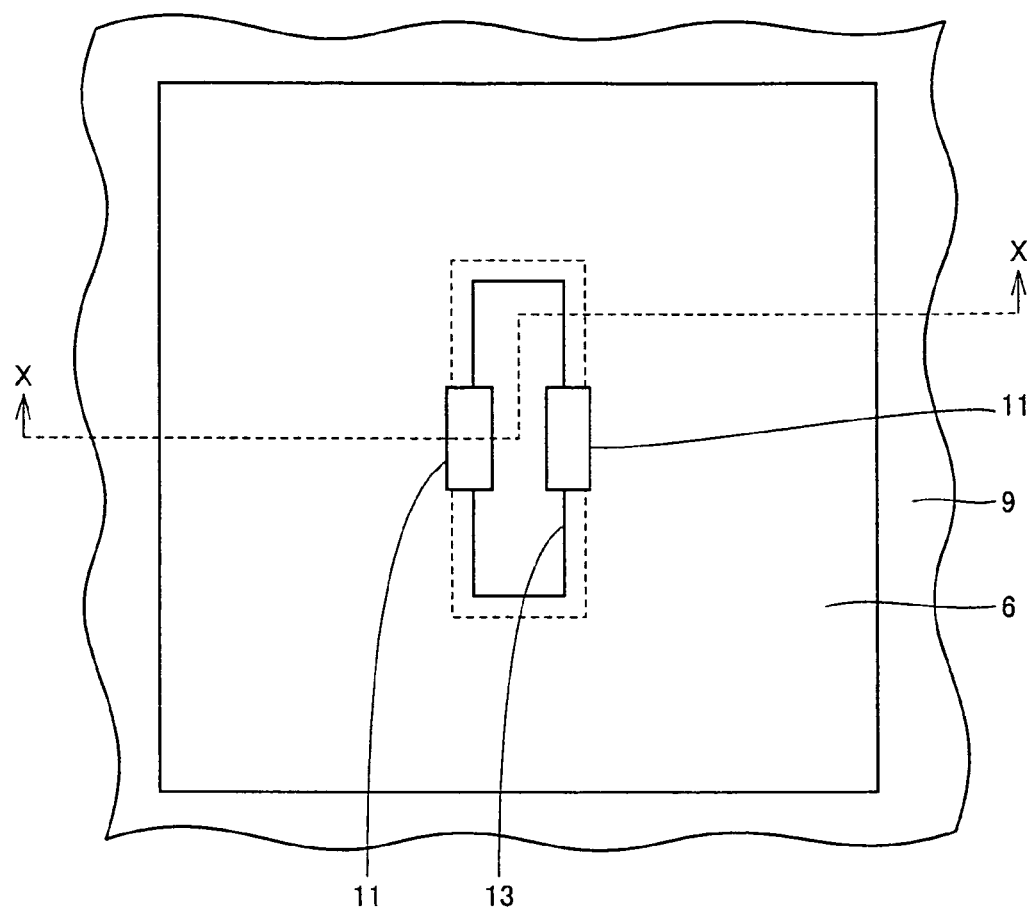
FIG. 9 is a plan view of a thermal infrared sensor device in a third embodiment in accordance with the present invention.
Figure 10:
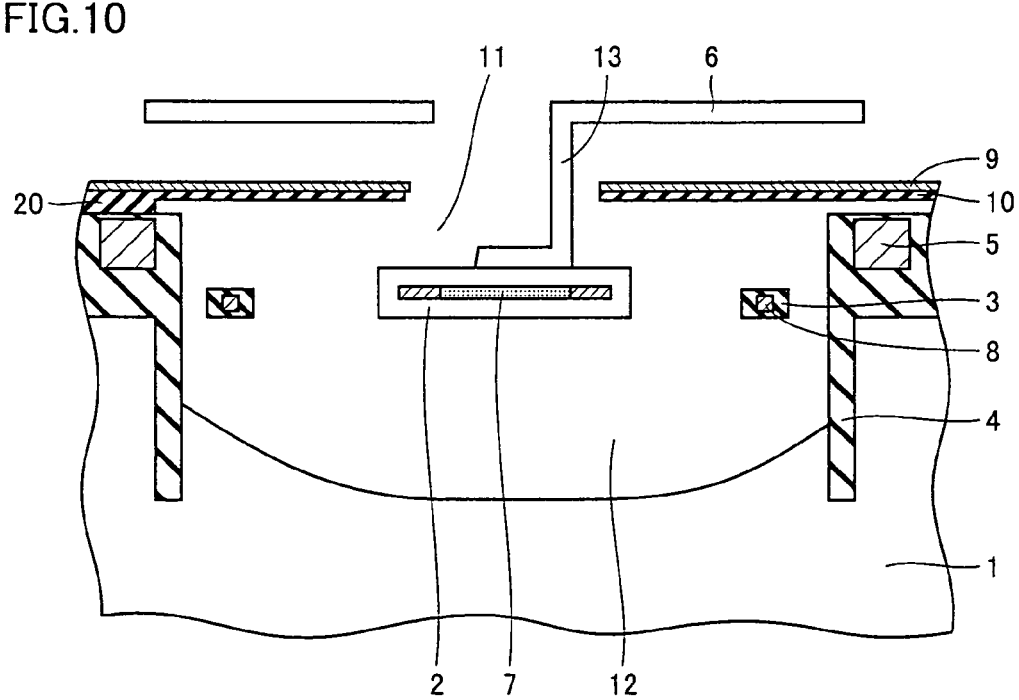
FIG. 10 is a cross-sectional view taken along line X—X in FIG. 9.

Referring to FIGS. 9 and 10, a thermal infrared sensor device in a third embodiment in accordance with the present invention will be described. When the thermal infrared sensor device is seen from above, absorbing hood portion 6 is provided to cover infrared reflecting film 9, as shown in FIG. 9. Absorbing hood portion 6 has substantially at its center a depression with pillar portion 13, and also has two etching holes 11 disposed at positions overlapping the depression so as to sandwich the depression. FIG. 10 shows a cross-sectional view taken along line X—X in FIG. 9. Otherwise, the thermal infrared sensor device in the present embodiment has a structure similar to that described in the first embodiment, such as having concave portion 12 formed in substrate 1 below absorbing hood portion 6.

In the present embodiment, etching hole 11 is formed by providing an opening in a region including a side face of pillar portion 13, as shown in FIG. 10. With this structure, communication is established between an internal space of concave portion 12 and a space above absorbing hood portion 6.

While etching hole 11 corresponds to a portion not capable of absorbing incident infrared radiation, etching hole 11 in the present embodiment is disposed so as to overlap pillar portion 13 when seen from above, reducing a total area of the portion not capable of absorbing incident infrared radiation. In particular, when a portion corresponding to the side face of pillar portion 13 is utilized to provide a large opening, etching hole 11 can have a smaller area when seen from above. Further, since the portion corresponding to the side face of pillar portion 13 hardly contributes to the absorption of infrared radiation by nature, etching hole 11 can be provided without deteriorating infrared absorption efficiency. Furthermore, in the present embodiment, fabrication of an additional structure is not required, and heat capacity is not increased.

Since substrate 1 is isotropically etched through etching hole 11 during the etching process to form concave portion 12, concave portion 12 generally has a bottom surface having the greatest depth at a portion directly under etching hole 11. In the present embodiment, etching hole 11 is disposed in the vicinity of the center, and thus the bottom surface of concave portion 12 tends to have the greatest depth in the vicinity of its central portion, as shown in FIG. 10. Consequently, concave portion 12 has a bottom surface having a shallower depth at its peripheral portion. Therefore, the lower end of etching-resistant wall 4 may be provided at a shallower position, facilitating the formation of etching-resistant wall 4.

Figure 11:
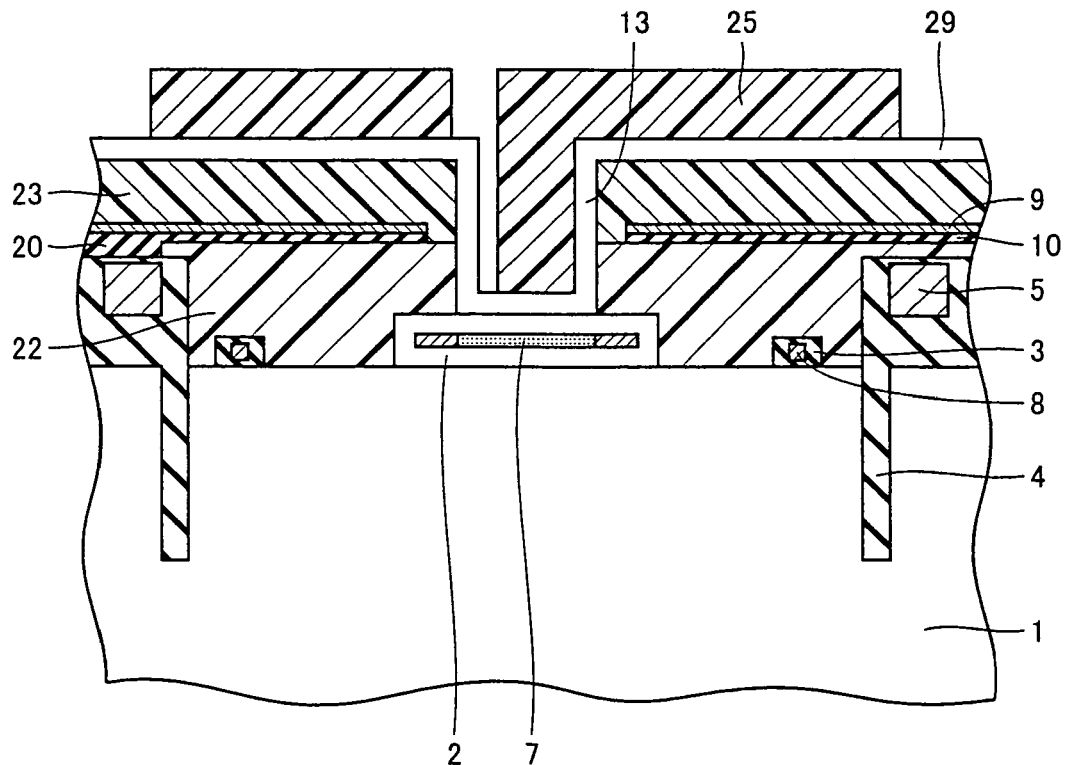
FIGS. 11–14 are cross-sectional views showing first through fourth steps, respectively, in a process of manufacturing the thermal infrared sensor device in the third embodiment in accordance with the present invention.
Figure 12:
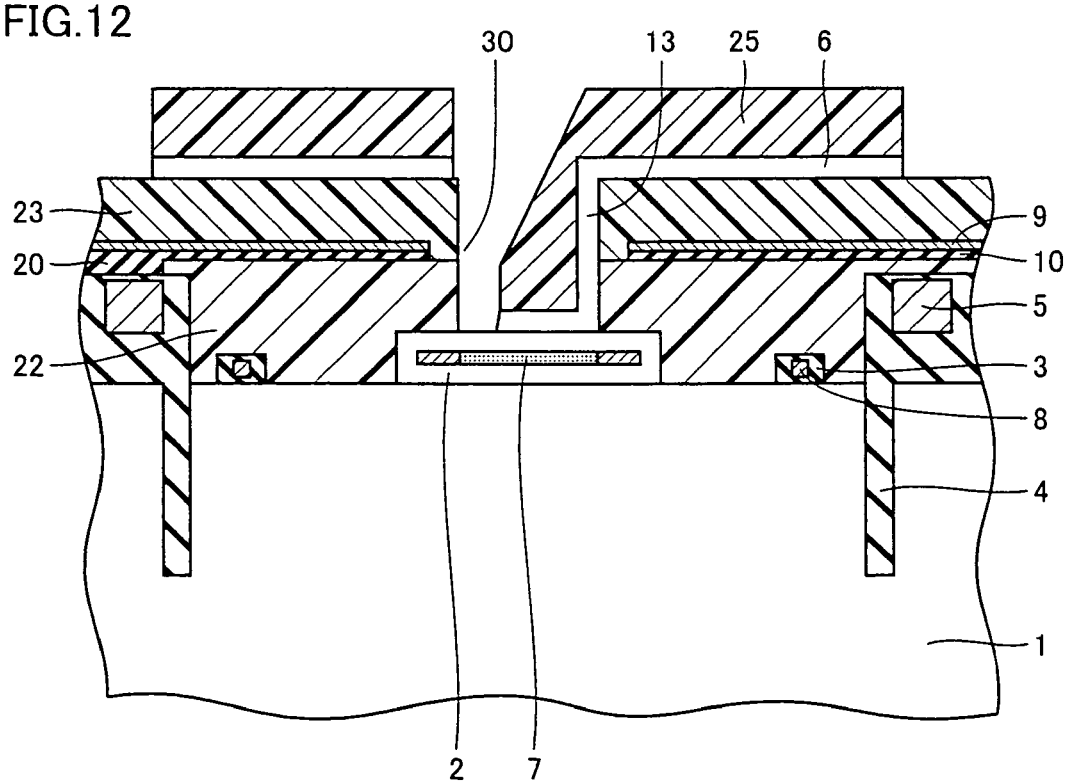
Figure 13:
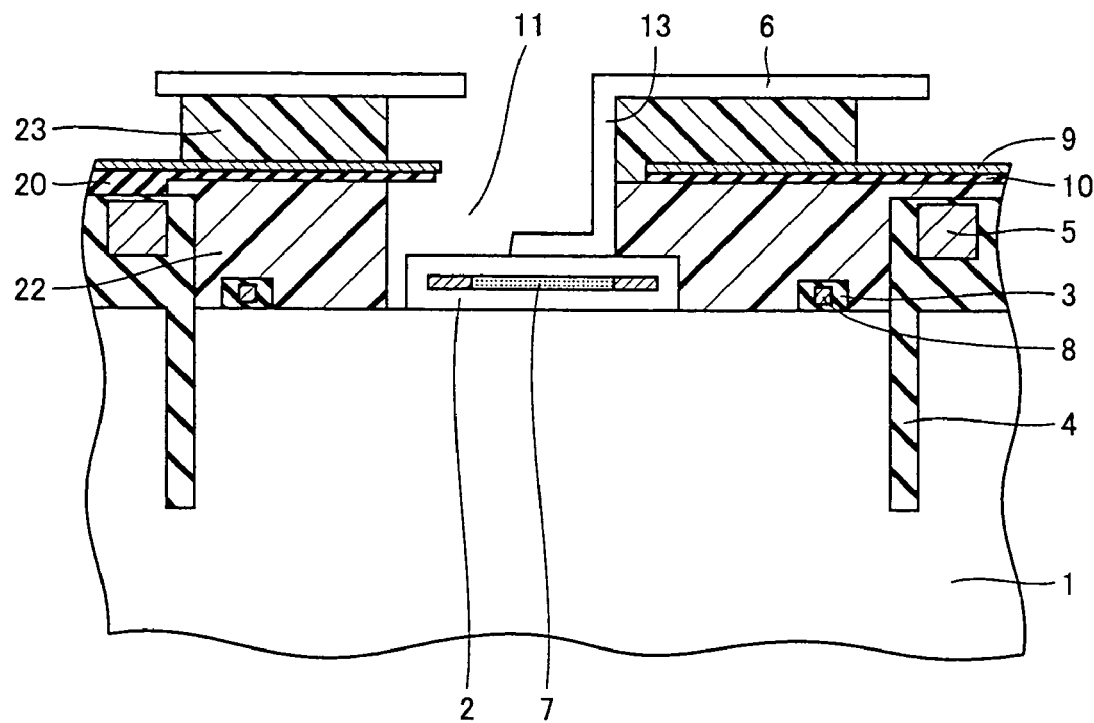
Figure 14:
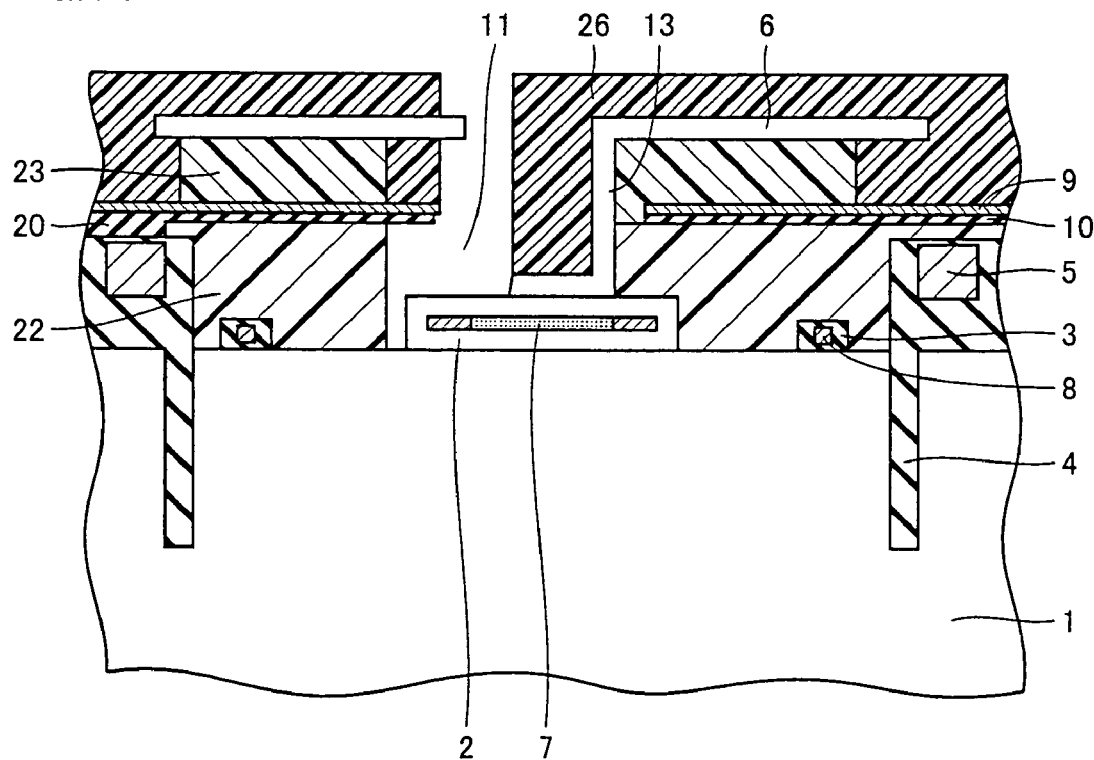

Referring to FIGS. 11–14, 9 and 10, a method of manufacturing the thermal infrared sensor device in the third embodiment in accordance with the present invention will be described. Firstly, a structure shown in FIG. 11 is fabricated. FIG. 11 shows that a film 29 which will later be a material of absorbing hood portion 6 (see FIG. 10) is formed over the entire structure, and a photoresist 25 is then formed to define the shape of absorbing hood portion 6. By performing isotropic etching, a portion of film 29 not covered with photoresist 25 is removed, and a structure shown in FIG. 12 is obtained. More specifically, absorbing hood portion 6 is formed. On this occasion, if the isotropic etching is performed by using for example carbon tetrafluoride gas, an opening 30, which will later be etching hole 11, is formed in a substantially vertical plane of pillar portion 13. Further, by performing isotropic plasma etching mainly using oxygen, opening 30 then reaches substrate 1 as shown in FIG. 13 to form etching hole 11. Substrate 1 comes to be exposed at the bottom of etching hole 11. Then, protective resist 26 is formed as shown in FIG. 14 to etch substrate 1. The etching is performed through etching hole 11. As a result, the thermal infrared sensor device having a structure shown in FIGS. 9 and 10 is obtained.

Note that protective resist 26 is preferably a negative-type photoresist in which only a portion exposed to light remains. When a negative-type photoresist is used, light for exposure in the photolithography process hardly reaches a portion under infrared reflecting film 9, and thus protective resist 26 is not exposed to light under infrared reflecting film 9 and washed away during a development process. Therefore, protective resist 26 is prevented from filling in etching hole 11 under infrared reflecting film 9, allowing etching to be performed smoothly.

Fourth Embodiment

While description has been made focusing on a single thermal infrared sensor device in the first to third embodiments, such thermal infrared sensor devices can be arranged in an array to be used as a thermal infrared sensor array.

Figure 15:
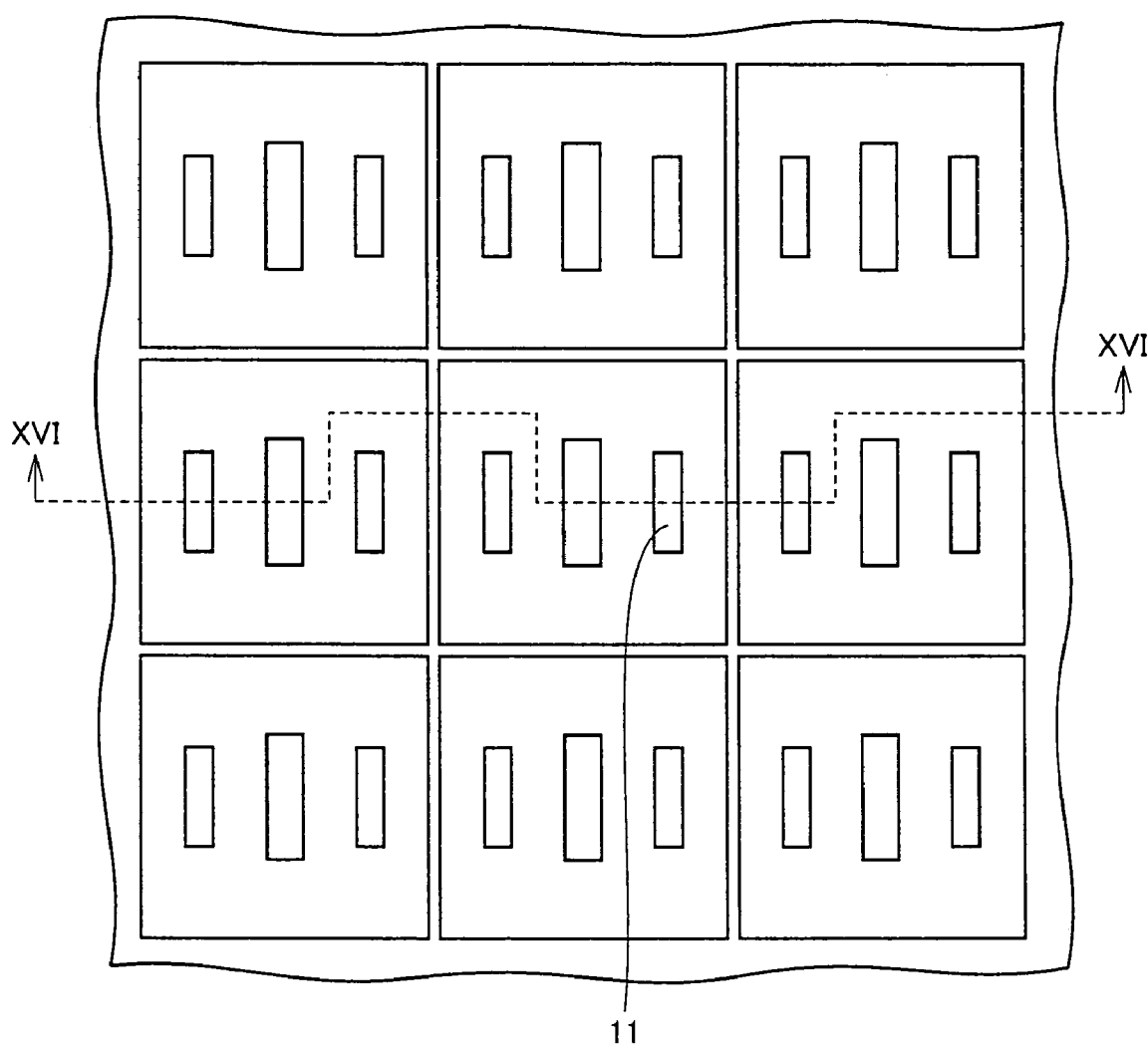
FIG. 15 is a plan view of a thermal infrared sensor array in a fourth embodiment in accordance with the present invention.
Figure 16:
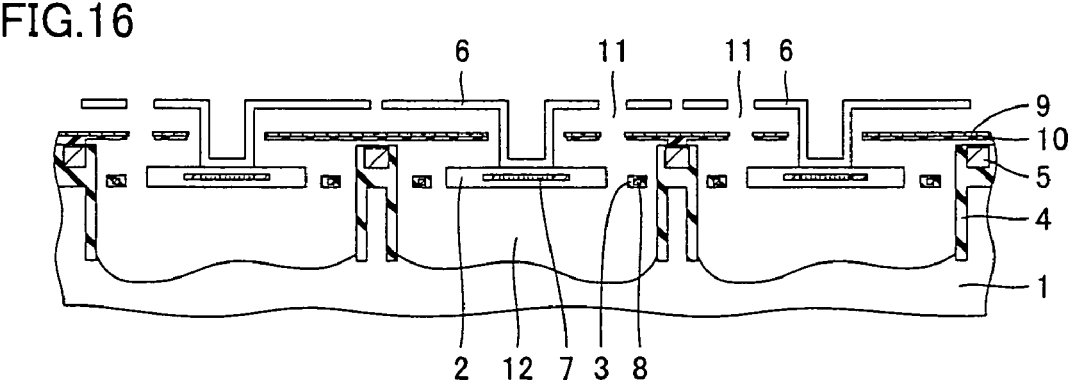
FIG. 16 is a cross-sectional view taken along line XVI—XVI of the thermal infrared sensor array in the fourth embodiment in accordance with the present invention.

Referring to FIGS. 15 and 16, a thermal infrared sensor array in a fourth embodiment of the present invention will be described. FIG. 15 is a plan view of the thermal infrared sensor array in the present embodiment. For clarity of description, the thermal infrared sensor array is illustrated which has nine thermal infrared sensor devices in total, arranged in three rows and three columns. Each thermal infrared sensor device is the one described in the first embodiment. As can be seen in FIG. 15, by arranging the thermal infrared sensor devices on a surface of substrate 1, absorbing hood portions 6 each included in the thermal infrared sensor device are regularly arranged, covering almost all over the region constituting the array. FIG. 16 shows a cross-sectional view taken along line XVI—XVI in FIG. 15.

Since absorbing hood portions 6 cover most of the upper surface of the thermal infrared sensor array in the present embodiment, incident infrared light can effectively be utilized for detection. The thermal infrared sensor array shown in FIG. 15 may be designed to select a thermal infrared sensor device in each row and each column by means of for example an external scanning circuit (not shown), and take data detected by each thermal infrared sensor device as a time-series signal.

While the array having the devices arranged in three rows and three columns is illustrated here, the number of the devices constituting the array is not limited to this. The array may be a linear sensor array in which the thermal infrared sensor devices are arranged in one row and N columns, or in N rows and one column, instead of being arranged so as to extend two-dimensionally. The signal may be read from each thermal infrared sensor device in parallel, instead of the method described above.

According to this structure, a sensor having a function as an imager for a thermal image in the infrared region can be fabricated.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A thermal infrared sensor device, comprising:
   a substrate having a concave portion;
   a temperature detecting portion connected to said substrate via a supporting leg and positioned opposite and at an opening of said concave portion;
   an infrared reflecting film and a support film supporting said infrared reflecting film, opposite at least a portion of said supporting leg and spaced from said supporting leg; and
   an absorbing hood portion opposite and spaced from said infrared reflecting film, spaced farther from said substrate than said infrared reflecting film and said support film, and extending laterally in a plate shape, opposite at least a portion of said infrared reflecting film and said support film.

2. The thermal infrared sensor device according to claim 1, comprising:
   an interconnection disposed opposite and spaced from a portion of said substrate, but not opposite said concave portion; and
   an interconnection protecting insulating film directly covering said interconnection wherein said support, film has a flat plate shape and is supported directly on an upper side of said interconnection protecting insulating film and said infrared reflecting film is in contact with an upper side of said support film.

3. The thermal infrared sensor device according to claim 2, wherein said infrared reflecting film is disposed on part of said support film but not on said support film opposite said interconnection protecting insulating film.

4. The thermal infrared sensor device according to claim 1, wherein said absorbing hood portion is thermally connected to said temperature detecting portion via a vertically extending tubular pillar in contact with an upper side of said temperature detecting portion, and said absorbing hood includes an etching hole establishing communication between said concave portion and space on a side of said absorbing hood portion opposite said concave portion.

5. The thermal infrared sensor device according to claim 4, wherein said etching hole is disposed substantially at a center of said concave portion when seen from directly opposite said concave portion.

6. A thermal infrared sensor array comprising a plurality of the thermal infrared sensor devices according to claim 1, wherein said plurality of thermal infrared sensor devices are arranged in an array.

7. The thermal infrared sensor device according to claim 1, wherein said infrared reflecting film and said support film are not thermally connected to said temperature detecting portion.

8. The thermal infrared sensor device according to claim 1, wherein said absorbing hood portion is thermally connected to said temperature detecting portion but not thermally connected to said infrared film or said support film.

9. The thermal infrared sensor device according to claim 8, wherein said infrared reflecting film and said support film are not thermally connected to said temperature detecting portion.

10. A thermal infrared sensor device, comprising:

a substrate having a concave portion;

a temperature detecting portion connected to said substrate via a supporting leg and positioned opposite and at an opening of said concave portion;

an infrared reflecting film opposite at least a portion of said supporting leg and spaced from said supporting leg; and an absorbing hood portion opposite and spaced from said infrared reflecting film, spaced farther from said substrate than said infrared reflecting film, and extending laterally in a plate shape, opposite at least a portion of said infrared reflecting film, and supported by a pillar, wherein said infrared reflecting film is not in contact with said temperature detecting portion or said pillar.

* * * * *